May 12, 1936.    F. I. WILLIAMS    2,040,352
DRIVING MOUNT FOR CENTRIFUGALS
Filed March 23, 1933
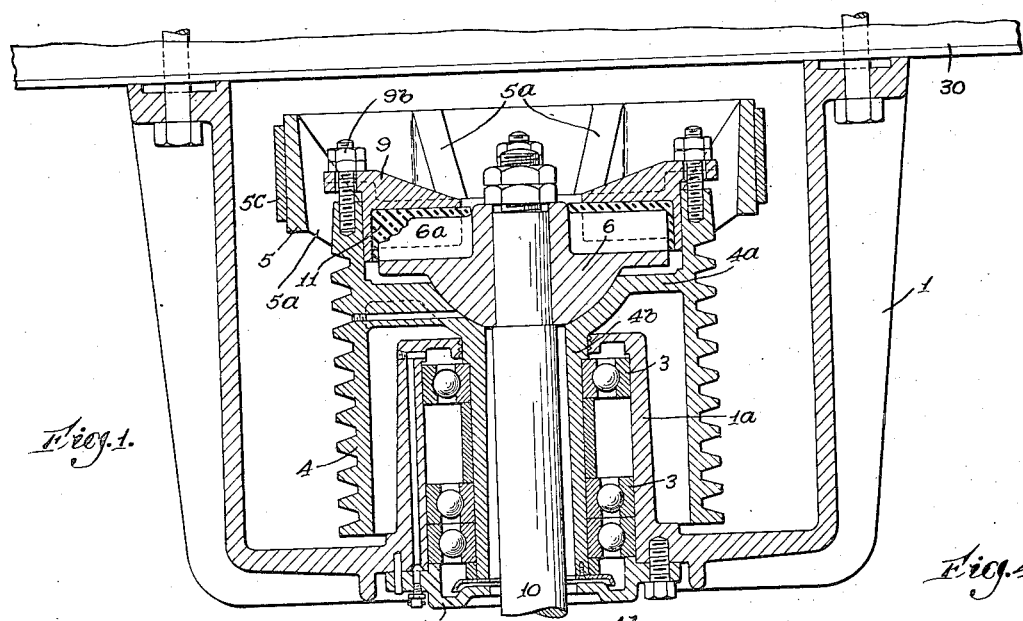
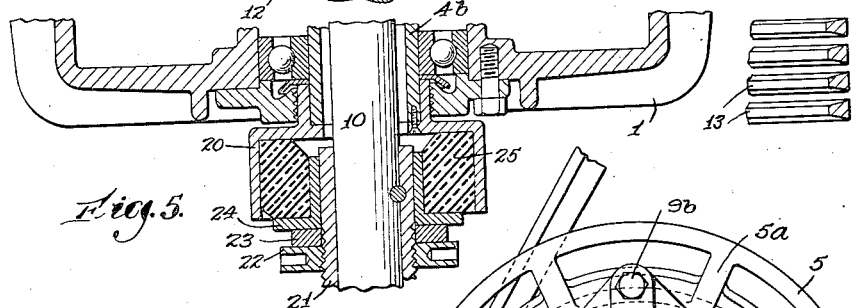
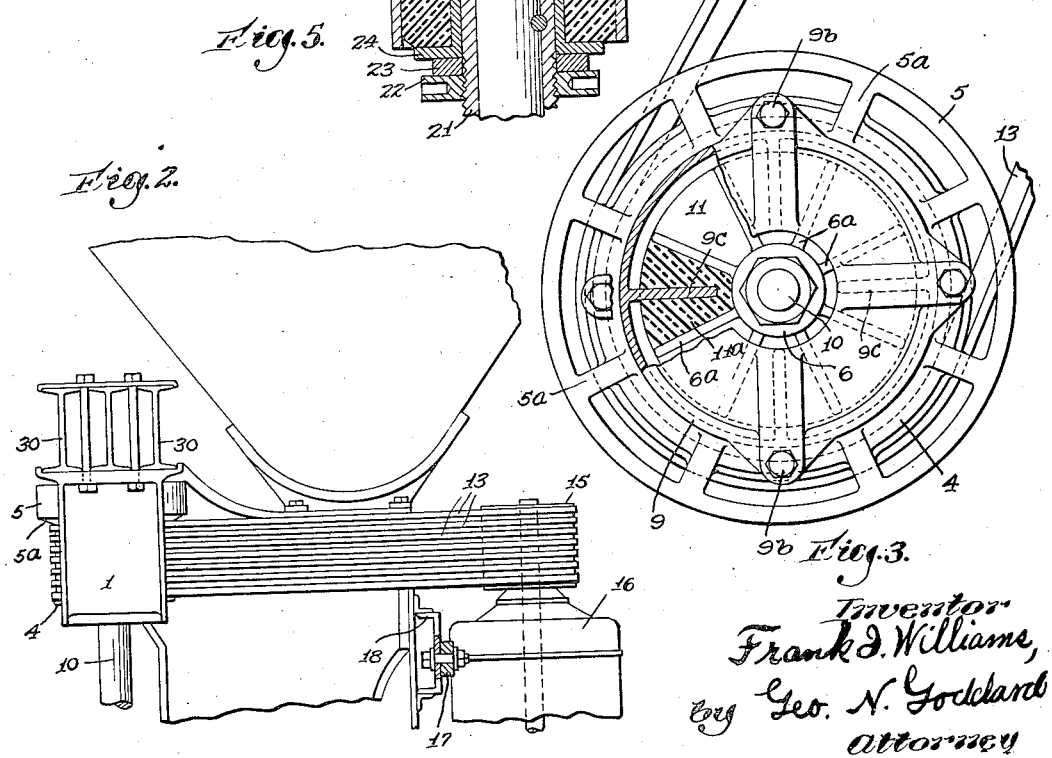
Inventor
Frank I. Williams,
By Geo. N. Goddard
Attorney Patented May 12, 1936

2,040,352

UNITED STATES PATENT OFFICE 2,040,352

DRIVING MOUNT FOR CENTRIFUGALS

Frank I. Williams, Boston, Mass.

Application March 23, 1933, Serial No. 662,206

10 Claims. (Cl. 308—148)

This invention relates to a driving mount for suspended centrifugal machines such as are used in the manufacture of sugar, starch, chemicals and the like, and is intended to provide a new and advantageous construction that will eliminate troubles that have long been inherent in the operation of such centrifugals as heretofore used.

Because of certain defects attending the use of the old style of belt drive, resort has been made of late years by centrifugal engineers to direct-connected electric motors for operating centrifugals of this type. However, not only does the substitution, where conditions are very favorable, of a direct connected motor for a belt drive involve heavy additional expense, but in many cases the supporting framework does not leave sufficient head room for installing a direct connected motor. Furthermore, owing to the nature of the current requirements of an electric motor that will efficiently operate such centrifugals, the current available in many factories is not well suited for operating a direct connected motor. Frequently, because of local conditions an electric driving motor for the centrifugal can be used only by means of a belt drive connection.

While a belt driven centrifugal is much the cheaper and simpler construction, yet as the pulley of such centrifugals is naturally secured direct to the gyratory basket shaft in position to receive the belt at the level of the center of gyration of the shaft, the tipping of the pulley to and fro with the sway of the centrifugal results in stretching alternately each edge of the belt while slackening the contact with the other edge and thus causes loss of traction, slip of belt and excessive wear requiring frequent belt replacements. Usually belt driven contrifugals have been operated by quarter-turn belts connected with drive pulleys on the horizontal line shaft at the rear of the mixer. This arrangement has precluded the use of the more effective V-belt drive since only a flat belt can be used under such conditions.

My present invention provides a novel construction and arrangement by which the faults and disadvantages of existing types of drive for gyratory centrifugals are overcome or eliminated and, generally speaking, it is characterized by the mounting of a driving head or pulley in non-oscillatory bearings so as to rotate about a fixed axis while the centrifugal itself is supported on said head or pulley by a universal joint permitting the basket to gyrate against yielding centralizing resistance. This and other features of the invention will be particularly described in the following specification and will be defined in the claims hereto annexed.

In the accompanying drawing I have illustrated a simple and convenient construction and arrangement embodying the principles of this invention, in which Fig. 1 is a vertical central section of the means for suspending and driving a suspended gyratory centrifugal.

Fig. 2 is an end elevation showing the upper portion of the centrifugal suspending shaft and a driving motor revolving about a vertical axis and connected with the centrifugal driving pulley by means of a horizontal belt extending below the usual mixer trough.

Fig. 3 is a plan view, partly broken away, to show the driving and centralizing connection between the suspended centrifugal and its supporting driving pulley.

Fig. 4 is a detail showing a portion of the V-belt for the driving pulley.

Fig. 5 is a vertical central section showing a modified arrangement of centralizing buffer interposed between the rotary head or pulley and the basket suspending shaft or spindle.

In the practice of the invention according to the form illustrated in Fig. 1, I provide a heavy stirrup-like hanger 1 comprising vertical arms and an inwardly and upwardly extending flange member 1ᵃ adapted to receive and support the exterior or stationary races of a series of ball bearing elements 3.

In these stationary or non-gyratory bearings 3 is revolubly supported a revolving head comprising an exterior pulley element 4 provided with an inwardly extending spider 4ᵃ integral therewith and with a tubular hub member 4ᵇ, which is revolubly supported by the aforesaid bearing elements so as to sustain the radial and the vertical or axial thrust of the driving head or pulley which carries the centrifugal. The inwardly extending spider 4ᵃ connecting the rim of the pulley with the hub 4ᵇ is provided with a spherical recess or seat in which is supported the spherically curved ball head 6, which is firmly secured to the upper end of the basket carrying shaft or spindle 10. The spindle is of smaller diameter than the interior bore of the tubular hub 4ᵇ of the driving head, so as to permit the necessary gyration to enable the centrifugal to gyrate under the stresses of an unbalanced load until it centers itself and spins steadily about its normal axis of rotation.

As it is desirable that the oscillation of the spindle should be yieldingly restrained, I interpose between the upper horizontal face of the suspension ball 6 and a compression ring 9 an elastic buffer element and preferably the buffer element is made in sector-shaped pieces adapted to fit between radiating flanges 6a, which form pockets for the reception of the sector-shaped buffer members 11. These buffer members 11 extend upward above the radial flanges or partitions 6a so that the compression ring 9, when forced downward by the clamping bolts 9b, can adequately compress the buffer without forming contact with the upper edges of the flanges 6a.

To impart the requisite torque without shock or hammering in the form shown, four of the sector-shaped buffer members 11a are slotted radially to fit around depending fins or flanges 9c that are integral with the compressing ring. This forms a shock absorbing cushion between the driving pulley or head and the suspension head in which the spindle is firmly secured.

With the above described construction, the basket shaft is permitted adequate gyration to enable it to find its own axis of rotation when the unbalanced load is distributed evenly in the basket and also establishes a substantially positive cushioned drive that absorbs all shocks of transmission of rotation from the pulley to the centrifugal.

The construction permits the use of a spherically curved suspension ball of large radius, thereby affording a wide area of spherical contact between the suspension ball and the socket formed in the driving head or pulley.

The upper end of the pulley carries by means of radial arm spider 5 the annular rim 5a of the brake pulley, which is engaged by the exterior brake band 5c.

The driving belt 13 preferably of the V type, as illustrated in Fig. 4, extends rearwardly to the power or driving pulley 15 which, like the hollow pulley of the centrifugal, rotates about a vertical axis so that the two pulleys have their axes in parallelism. Any desired form of power transmission may be employed for driving the pulley 15. In this case I have shown in Fig. 2 a motor 16 revoluble about a vertical shaft. The motors may be supported by means of horizontal slides 17 adjustably bolted to bracket 18 so as to permit taking up of slack or looseness in the transmission belts 13.

An underneath cover plate 12 is attached to the bottom of the hanger flange 1a to catch any drip from the lubrication supplied to the bearing races by suitable lubricating ducts, and supports the down thrust of the bearings.

Instead of employing an overhead buffer for centralizing and opposing yielding resistance to the gyration of the shaft, the centralizing buffer may be located at the lower end of the tubular hub of the pulley, as shown in Fig. 5. In this case, a flanged buffer-receiving cup or ring 20 is secured to the lower end of the tubular hub 4b of the pulley and the centrifugal basket shaft carries a fixed exteriorly threaded collar 21 on which is mounted a spanner nut 22, which thrusts against a washer 23 bearing against an overhead flanged collar 24 slidably mounted on the fixed collar 21 and engaging the interior face as well as the bottom face of the elastic buffer 25. By turning up the spanner nut the buffer can be compressed to any desired degree of resistance to oppose the desired yielding restraint against the gyration of the basket shaft of the centrifugal.

It will be noticed that the driving torque from the pulley to its suspended centrifugal, as well as the drag exerted by the brake, is transmitted to the centrifugal at substantially the center of oscillation. Furthermore, the suspending of the driving centrifugal shaft upon and through the driving pulley or head not only permits the use of a suspension ball of large diameter which affords ample supporting area on the socket seat formed in the pulley, but this construction brings the center of gyration very close up to the I beams 30 to which centrifugal hangers are usually suspended, thus affording the maximum possible length to the basket spindle which is very desirable from a practical engineering point of view. Not only does the construction permit the use of a V-belt, whose traction is much more efficient than that of a flat belt, but with any form of belt it avoids the excessive wear and stretch of the belt due to the tilting of the driven pulley with relation to the normal plane or path of movement of the belt and thereby effects great economy in belt repairs and replacements. By largely eliminating slippage of the belt, which this construction effects, the operation of the centrifugal becomes much more efficient because of the rapid pick-up or acceleration that can be obtained.

It will be observed that whether the centralizing buffer be placed at the top of the pulley, as shown in Fig. 1, or below it, as shown in Fig. 5, provision is made in both cases for the setting or adjustment of the buffer compressing member in order to permit the desired degree of resistance to the gyration of the centrifugal.

What I claim is:

1. A driving mount for a suspended centrifugal embracing a belt driven pulley revolubly mounted on a fixed overhead hanger to rotate about a fixed axis and provided with a tubular hub, a gyratory centrifugal basket shaft suspended from said pulley through said tubular hub to permit gyration against yielding centralizing resistance about a center included in said axis of rotation, and means for causing the centrifugal to rotate in unison with the pulley.

2. The combination with a non-gyratory centrifugal driving pulley provided at its upper end with a ball-receiving socket and having a central axial passage extending downward from said socket, a gyratory centrifugal basket shaft extending upward through said passage and having secured to its upper end a gyratory suspension ball seated in said socket, and means for transmitting the rotation of the pulley to said shaft through said suspension ball while permitting gyration of the centrifugal against yielding centralizing resistance.

3. The combination with a non-gyratory centrifugal driving pulley provided with a rigidly connected brake pulley, said driving pulley being provided with a spherically curved socket, a centrifugal basket shaft secured at its upper end to a spherically curved suspension ball seated in said socket, a buffer element mounted on the upper face of said suspension ball, and a compression member secured to the upper end of said pulley and adjustable against said buffer to compress the same and thereby afford the desired elastic resistance to the gyration of the centrifugal in relation to the axis of rotation of the pulley.

4. A driving mount for a suspended centrifugal embracing in its construction a non-gyratory centrifugal supporting and driving head, a centrifugal suspended from said head by a flexible joint permitting gyration of the centrifugal about the axis of rotation of the head, and a yielding centralizing buffer element arranged to oppose yielding resistance to the gyration of the centrifugal and also serving as a yielding medium for transmitting rotation of the head to the centrifugal.

5. A driving mount for a centrifugal embracing a fixed hanger provided with vertically spaced annular anti-friction bearings, a non-gyratory centrifugal supporting and driving belt driven pulley, whose belt-engaging rim surrounds said bearings by which the pulley is revolubly supported, and a gyratory centrifugal rotated by and suspended from said pulley to permit gyration of the centrifugal in relation to the axis of rotation of the pulley.

6. A driving mount for a centrifugal embracing in combination a fixed hanger, a non-gyratory belt driven pulley revolubly supported on said hanger by upper and lower spaced antifriction bearing elements disposed interiorly of the belt-engaging rim of the pulley, a gyratory centrifugal suspended from said pulley by a flexible joint to permit gyration of the centrifugal while rotated in unison with the pulley, and means providing a yielding but variable resistance to the gyration of the centrifugal.

7. A driving mount for a suspended centrifugal embracing a non-gyratory revoluble supporting and driving head mounted to rotate about a fixed axis, a gyratory centrifugal suspended by ball and socket joint connection with said head to permit gyration of the centrifugal when rotating in unison with said head, and a centralizing buffer interposed between the centrifugal and the head to oppose yielding resistance to such gyration and acting to force the suspension ball member snugly against the socket member through the medium of the elastic force of the buffer when it is compressed.

8. A driving mount for a suspended centrifugal embracing a non-gyratory driving and supporting head, a gyratory centrifugal suspended for rotation from said head by a flexible joint comprising a suspension ball secured to the centrifugal shaft and a supporting socket carried by the driving head, the ball being provided with upwardly projecting radial members arranged to receive the torque thrust of interposed vanes carried by the driving head, thereby affording flexible drive transmission means permitting gyration of the centrifugal in relation to the driving head.

9. A driving mount for a suspended gyratory centrifugal embracing in combination a fixed overhead suspension hanger provided with interiorly disposed anti-friction bearings, a belt driven pulley having an interiorly disposed central hollow hub member revolubly mounted in said bearings for rotation about a fixed vertical axis, a gyratory centrifugal basket shaft coaxially suspended from the upper portion of said hollow hub by a universal joint to hang through said hollow hub whereby rotation of said centrifugal is imparted through said universal joint while permitting gyration of the basket shaft against yielding centralizing resistance.

10. In a driving mount for a suspended gyratory centrifugal the combination with a fixed overhead hanger, of a belt driven pulley mounted in said hanger to revolve about a fixed vertical axis, a gyratory centrifugal basket shaft provided at its upper end with a spherically curved suspension ball seated in a socket formed in the central portion of said pulley and permitting the basket shaft to hang through a central bore in said pulley whereby rotation of the pulley is transmitted to the basket shaft, and a centralizing buffer arranged below said pulley to oppose yielding centralizing resistance to the gyration of the basket shaft.

FRANK I. WILLIAMS.